United States Patent
Wick et al.

[11] Patent Number: 5,617,645
[45] Date of Patent: Apr. 8, 1997

[54] NON-CONTACT PRECISION MEASUREMENT SYSTEM

[75] Inventors: William R. W. Wick, c/o Precision Measurement Systems, Inc., 150 Breaden Dr. #C, Middletown, Ohio 45050; Pamela G. Wood, West Chester, Ohio

[73] Assignee: William R. W. Wick, Hamilton, Ohio

[21] Appl. No.: 432,630

[22] Filed: May 2, 1995

[51] Int. Cl.$^6$ ................................. G01B 11/24
[52] U.S. Cl. ............... 33/551; 33/DIG. 21; 250/559.23; 250/559.39
[58] Field of Search .................... 33/228, 275 R, 33/276, 286, 501.02, 533, 551, 553, 645, 700, DIG. 21; 250/559.23, 559.27, 559.3, 559.31, 559.39; 356/373, 376, 381

[56] References Cited

U.S. PATENT DOCUMENTS

| | | | |
|---|---|---|---|
| 3,126,643 | 3/1964 | Barbknecht et al. | 33/645 |
| 3,840,301 | 10/1974 | Pryor et al. | 356/109 |
| 4,276,480 | 6/1981 | Watson | 356/381 |
| 4,750,141 | 6/1988 | Judell et al. | 33/551 |
| 4,916,824 | 4/1990 | Shimazutsu et al. | 33/533 |
| 5,001,356 | 3/1991 | Ichikawa | 250/559.27 |
| 5,067,817 | 11/1991 | Glenn | 356/376 |
| 5,107,132 | 4/1992 | Garcia Pastor et al. | 356/376 |
| 5,210,593 | 5/1993 | Krämer | 356/381 |
| 5,519,944 | 5/1996 | Delastre | 33/533 |

FOREIGN PATENT DOCUMENTS

| | | | |
|---|---|---|---|
| 1-295108 | 11/1989 | Japan | 33/551 |

OTHER PUBLICATIONS

Digilaser, by Fixtur–Laser Inc., U.S.A.

*Primary Examiner*—G. Bradley Bennett
*Attorney, Agent, or Firm*—Thompson Hine & Flory LLP

[57] ABSTRACT

The invention is a non-contact precision measurement system and a method of measuring using the system. The surface contour of an object is measured, utilizing non-contact components, such as lasers. A measurement unit traverses a linear positioner which is parallel to the object to be measured. Then deviations are measured from a baseline reference to determine any deviations in the positioner. The measurement unit also measures the distance between the positioner and the object to produce a distance profile which is adjusted in accordance with the deviations to determine a true surface profile. This system can also be used to measure both an upper and lower surface profile to determine a thickness or to align a plurality of objects in parallel.

25 Claims, 4 Drawing Sheets

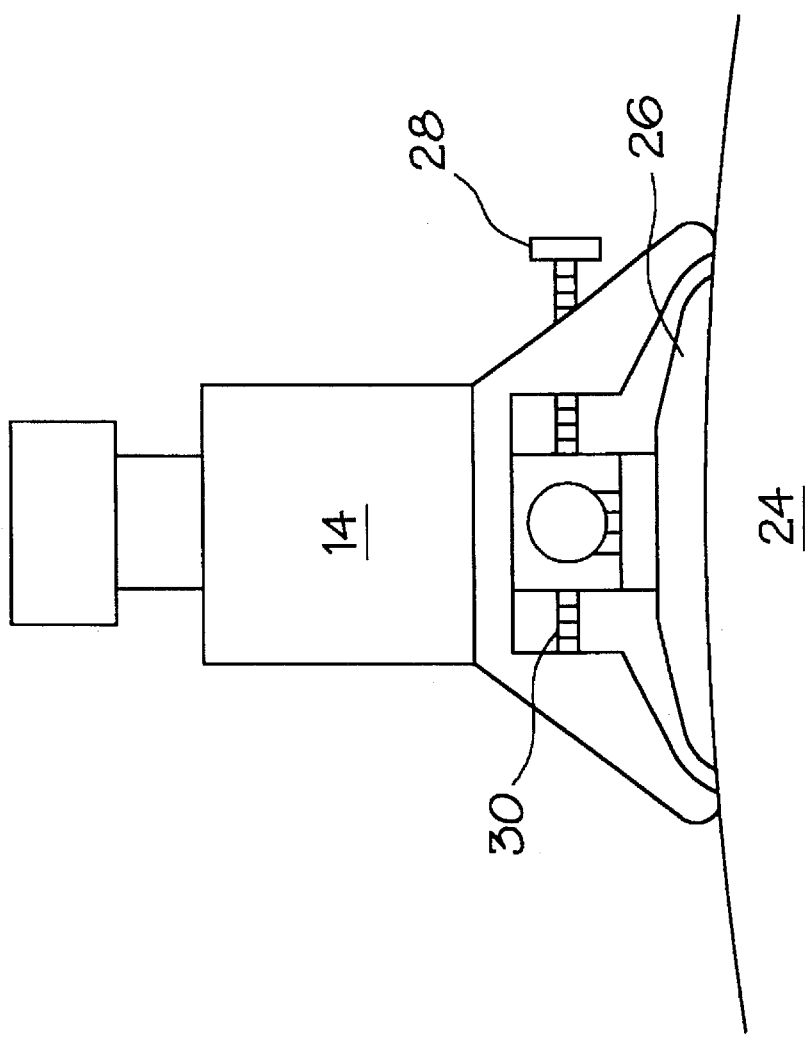

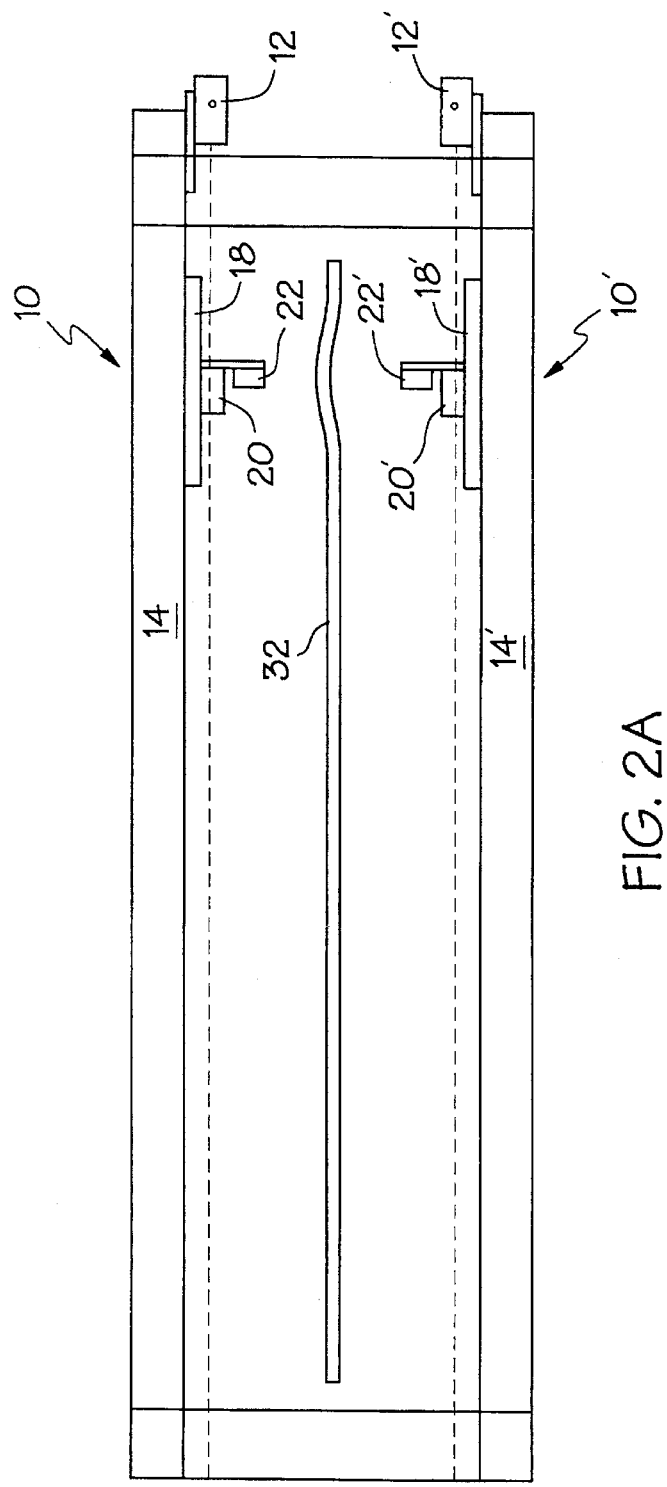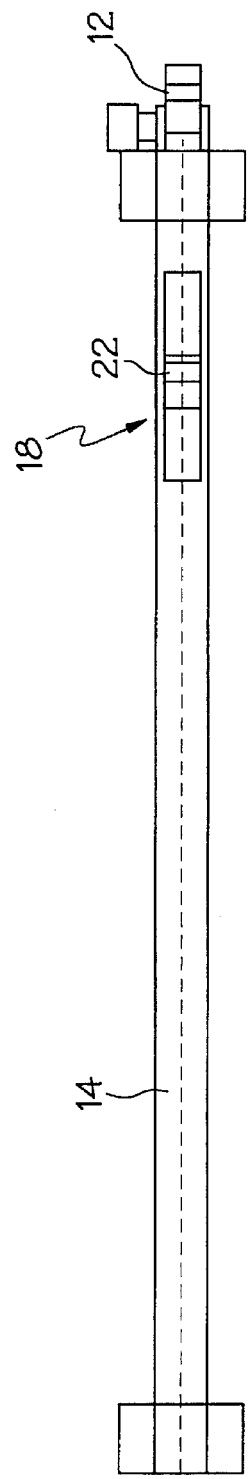
FIG. 2A
FIG. 2B

NON-CONTACT PRECISION MEASUREMENT SYSTEM

BACKGROUND OF THE INVENTION

The present invention relates to surface contour and thickness measuring devices and, more particularly, to surface profile and thickness measuring devices utilizing non-contact components such as lasers.

In the manufacturing industry, it is often necessary to measure deviations and surface profile of a workpiece, such as a sheet of rolled metal material, or a coil of sheet material. Mechanical devices have been used in which a carriage traverses the width of the object whose surface profile is to measured, and an arm or probe contacts the surface. The carriage moves along a straight line, and deviation in the surface contour cause the contacting arm to pivot relative to the carriage. This pivoting movement is recorded, either mechanically by means of a pen and graph arrangement or the like, or electronically by means of motion transducers. An example of such a device is shown in U.S. Pat. No. 4,403,419, issued Sep. 13, 1983.

A second generation of measuring devices has been developed in which a laser is used to provide a reference line or base line. Such a system is manufactured by Fixture-Laser ab of Sweden and includes a laser transmitter and a laser detector. The laser is capable of detecting changes in the position of a detector which is directed to its detecting surface. In order to detect deviations in surface profile, the laser transmitter generates a laser which extends substantially parallel to the surface to be measured, and the laser detector is moved along the surface.

Deviation of the detector along the surface relative to the directed laser generates a digital signal which can be recorded. However, such systems still rely upon physical contact between the surface to be measured and the measuring device. Such physical contact can have a negative effect on the accuracy of the measurements taken, and cannot be used to measure any substance that deviates on contact.

Accordingly, there is a need for a measurement system in which physical contact between the measurement apparatus and the surface to be measure is eliminated, and which is highly accurate.

SUMMARY OF THE INVENTION

The present invention is a measurement system in which physical contact between the measuring device and the surface to be measured has been eliminated. Rather, the present invention includes a laser triangulation sensor which determines the distance between the measuring device (detector) and the surface to be measured with high precision.

Accordingly, in a preferred embodiment of the invention, the system includes a carriage which supports a laser triangulation sensor that detects the distance of the carriage from the surface to be measured. The carriage is mounted on a linear positioner for linear movement relative to the surface to be measured. A laser transmitter is mounted on an end of the linear positioner and transmits a reference laser which is positioned substantially parallel to the surface to be measured.

The carriage is displaced along the linear positioner above the surface to be measured and the triangulation sensor detects the distance between the surface and the carriage. Mechanical deviations of the carriage from a straight line as it is displaced along the linear positioner are detected by the laser detector and used to generate a correction factor which is added to or subtracted from the distance measurement of the triangulation sensor. The result is a highly accurate mapping of contours of the surface profile of the object measured.

Typically, the embodiment described above is used to map the surface contours of flat, sheet-like objects such as sheet metal, or to measure the surface contour of the outer surface of coiled material. In other embodiments of the invention, two such systems are used simultaneously to measure the upper and lower surface profiles of a sheet of material. The differences in surface readings are combined to yield a highly precise thickness measurement of the sheet. More axes can be added to measure three dimensional objects of large volume such as automobiles bodies, aircraft wings.

In addition, the system of the present invention can be used to align machine parts, such as rotating axles. By providing an initial laser baseline which is reflected by a pentaprism, or set of pentaprisms, a plurality of parallel baselines can be generated, each perpendicular to the main laser baseline and providing a reference baseline for a laser measurement system comprising a linear positioner having a displaceable carriage, a laser detector mounted on the carriage and a triangulation laser sensor used to measure the distance from the carriage to the machine part to be aligned. Consequently, such a system can be used to align a rotating axle with high precision relative to a base line, or to align a plurality of rotating axles with respect to each other with high precision.

Accordingly, is an object of the present invention to provide a measurement system in which a workpiece whose surface profile is to be measured is not physically contacted, thereby eliminating any inaccuracies resulting from compression of the workpiece itself; a measurement system which compensates for mechanical inaccuracies in the system itself; a measurement system in which a laser baseline is used to compensate for deviations in the performance of mechanical components; a measurement system in which a noncontacting triangulation laser sensor is used to determine the distance from the object to be measured to the measuring device; a measuring device in which all of the components are relatively inexpensive and are readily commercially available; and a measuring device which is easy to operate and can be configured to apply to a number of alignment and measuring applications.

Other objects and advantages of the present invention will be apparent from the following description, the accompanying drawings and the appended claims.

BRIEF DESCRIPTION OF THE DRAWINGS

FIG. 1(c) is a cross-sectional view of the measurement system taken at line 1(c)—1(c) of FIG. 1(a);

FIG. 2(a) is a top plan view of an alternate embodiment of the non-contact measurement system of the present invention, used for measuring thickness of a workpiece;

FIG. 2(b) is a side elevational view of the measurement system of FIG. 2(a)

DETAILED DESCRIPTION

As will be discussed in greater detail with reference to the accompanying drawing figures, in the present invention, a laser is used as a baseline or reference line from which deviations of the linear positioner, which carries the laser sensor, are detected. This baseline is used to establish a constant, straight reference line for measuring both the mechanical straightness of the linear positioner or stage and as a known, precisely straight reference line from which other components and associated baselines are aligned.

Figure 1A:
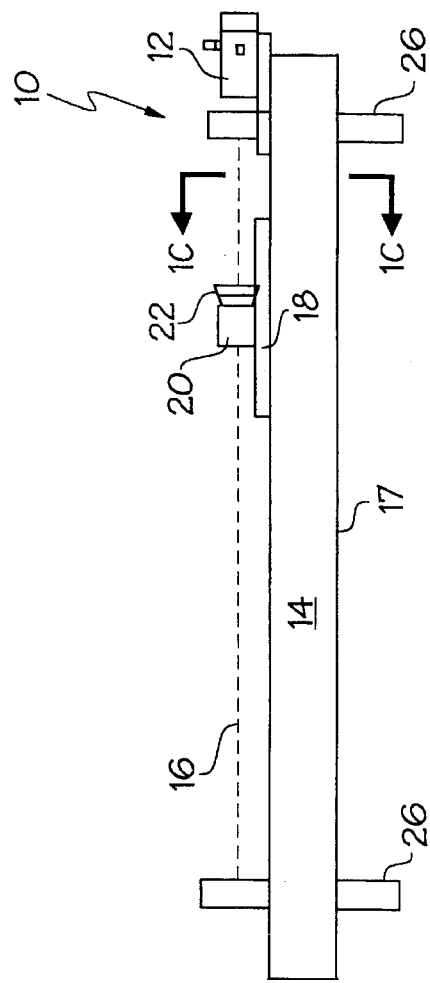
FIG. 1(a) is a top plan view of a preferred embodiment of the non-contact surface measurement system of the present invention.
Figure 1B:
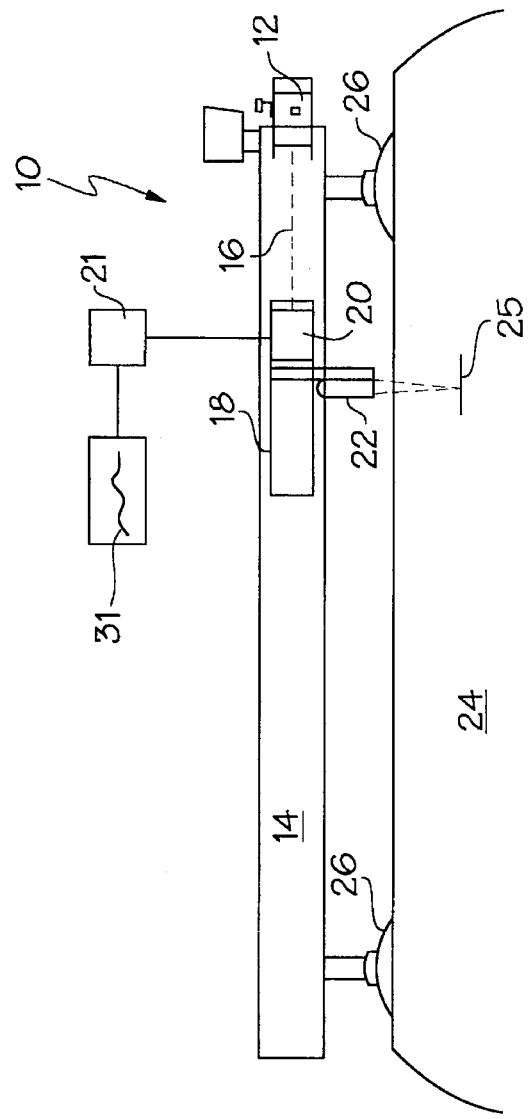
FIG. 1(b) is a side elevational view of the measurement system of FIG. 1(a)

FIGS. 1(a)–(c) show a non-contact precision measurement system, generally designated 10, in accordance with a first embodiment of the present invention. The system 10 includes a first laser transmitter 12 mounted on a linear positioner 14 and oriented so that the laser beam 16 it generates extends substantially parallel to the rail 17 of the positioner. The transmitter 12 may be a model FL11 laser transmitter manufactured by Fixtur-Laser AB of Mölndal, Sweden. An exemplary linear positioner 14 is a modular roller bearing linear positioner with integral tracks having support rollers, such as the DAEDAL 204000 Series positioners by Parker-Hannifin Corp., Cleveland, Ohio. The laser beam 16 that is generated by the transmitter 12 defines the baseline.

The linear positioner 14 includes a movable carriage 18 on which is mounted a laser detector 20, such as the biaxial position-sensitive model FD11 detector by Fixtur-Laser AB of Mölndal, Sweden. The positioner 14 is actuated to displace the carriage 18 along the rail 17 on a path which is substantially parallel to the laser baseline 16.

The system 10 also includes a triangulation sensor 22 which measures the distance to the surface of the object 24 being examined in order to measure its surface profile. The triangulation sensor 22 is preferably a model LM100/LM200 Series laser analog sensor manufactured by Aromat Corporation, New Providence, N.J., although other, comparable systems may be used which provide higher resolution. The linear positioner 14 is attached to the surface of the object 24. One preferred method of attachment which may be utilized is a pair of suction cups 26, which are adjustable by levelling screws 28 and spring assembly 30 (see FIG. 1(c)).

The operation of the system 10 is as follows. The linear positioner is first mounted on the object 24 to be measured and is leveled by screws 28 and spring assembly 30 such that the carriage 18 will travel in substantially a parallel path relative to the surface 25 to be measured on object 24. Linear positioner 14 is then actuated to displace the carriage 18 along the rail 17 and deviations of the carriage 18 from a precisely straight path are detected by the laser detector 20, since the detector will be displaced vertically and/or horizontally relative to the laser baseline 16 by mechanical inaccuracies existing between the carriage 18 and rail 17.

Measurements are taken at discrete points along the rail 17, and any deviations of the carriage 18 and detector 20 cause the detector to generate a signal which is transmitted to a computer 21. The computer digitizes the measurement signals received from the detector as it traverses the rail 17 and stores the data or displays the data graphically on a screen or printout. This data is used to adjust measurement values taken by the triangulation sensor 22 which result from inaccuracies in the travel of the carriage 18.

Next, the carriage 18 is displaced along the rail 17 and distance measurements between the sensor 22 and the surface 25 of the object 24 are taken, at the same set of discrete points along the rail. After a predetermined number of data points have been logged, the data are collected and stored in a data base. These real time measurements are recorded in a data base using a form of averaging to eliminate dynamics. The number of measurements to be taken (or population size), depends upon the level of precision required for the particular surface 25. The system 10 is adjustable either by initial setup, data deviation or the speed of travel of the carriage 18. Throughout this process, no physical contact with the object 24 is made by the sensor 22 as measurements are taken along the surface 25.

The true profile 31, displayed by computer 21 (see FIG. 1(b)) of surface 25 is the sum of the two sets of readings: (1) the deviation of the carriage 18 from the baseline laser 16 and (2) the deviation of the surface 25 from the sensor 22 on the carriage. This is an actual profile with no further compensation required for mechanical inaccuracy of the carriage travel or the deflection of the surface 25 by a measurement device.

The basic formula for the true surface profile of the object is:

$$A \text{ (BASELINE DEVIATION)} + B \text{ (SURFACE PROFILE DISTANCE)} = \text{TRUE PROFILE}$$

Therefore, $$A + B = \text{TRUE PROFILE AT CURRENT POSITION}$$

In the preferred embodiment, a number of readings are taken at each discrete location, and a statistical mean is calculated by the computer 21. In such case, "A" in the above equation is digital deviation from the baseline which is a statistical mean at each position and "B" is the digital profile distance to the surface 25. If the value for "B" is recorded in analog form, it must first be converted to a digital value before further processing.

In the procedure in which a number of readings are taken at each location, the above calculation is repeated at each position. The sample size and the rate of data acquisition can be adjusted by the controller of the system. The data may be displayed graphically and/or stored in the data base. Graphical data may be monitored during the process.

As shown in FIGS. 2(a) and 2(b), in another embodiment of the present invention, the above process may be conducted simultaneously on opposite sides of an object 32 and a mathematical sum calculated in order to determine the true thickness of the object. In this embodiment, there are two identical systems 10, 10', each as described above, positioned in opposing relation to each other and relative to the object 32 such that one system is on each side of the object. Two linear positioners 14, 14' are positioned on opposite sides of the object 32 to be measured. Two baseline transmitters 12, 12' are mounted on the positioners 14, 14', respectively, to provide straight reference lines 16, 16' on each side of the object 32. Optionally, a single laser transmitter with a beam splitter and a "penta prism" may be used to provide the reference line.

Each system 10, 10' is actuated as described above with reference to FIGS. 1(a)–1(c) and measurements are taken to determine the deviations of the carriages 18, 18' and the distances between the sensors 22, 22' and the object 32. Since the distances between the two sensors 22, 22' are fixed, the actual thickness of the object 32 is determined by subtracting the distance readings of the sensors 22, 22' from the measured value of the distance between the sensors themselves.

Figure 3:
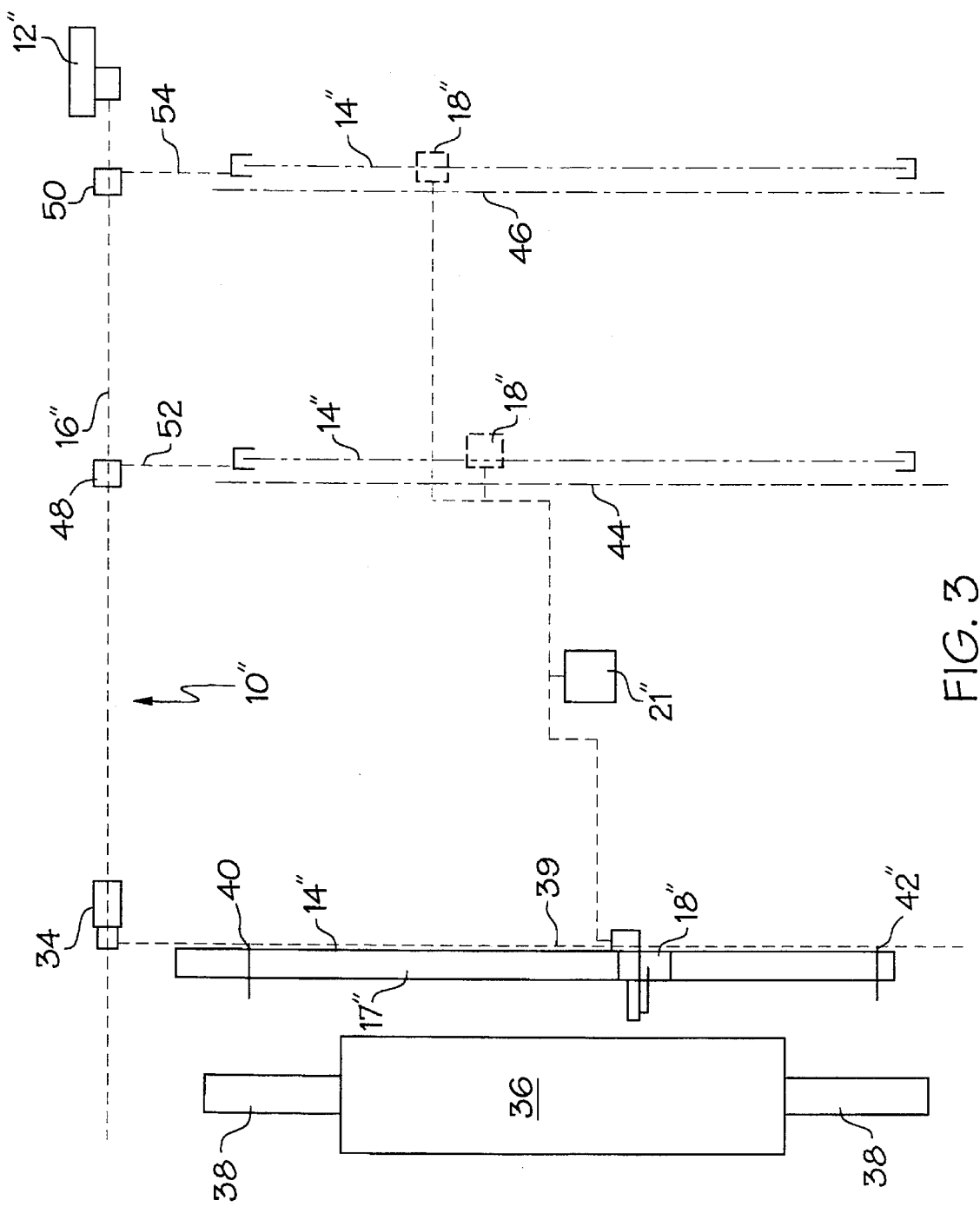
FIG. 3 is a top plan view of a second alternate embodiment of the non-contact alignment measurement system of the present invention.

Another embodiment of the present invention is shown in FIG. 3, in which the alignment of an object 36 on a spindle 38 can be measured. As shown in FIG. 3, the laser transmitter 12" establishes a primary baseline 16" which is split by a rotary penta prism 34 that deflects the beam to form a secondary baseline 39, which is exactly 90° to the primary baseline 16". Since the baselines 16", 39 are formed from an undeviating light source, they are always straight, perpendicular to each other and in a known position.

The object 36 may be in constant rotation about axle 38. The system 10" is positioned relative to the object 36 such that reference baseline 39 is substantially parallel to axle 38. A positioner 14" is positioned adjacent to the object 36 such that the rail 17" is substantially parallel to the axle 38, and carriage 18" traverses the length of the object. With system 10", there is no laser transmitter mounted on the positioner 14" (although the prism 34 may be mounted on the positioner 14"); the baseline laser beam 39 is generated solely by transmitter 12".

Positioner 14" is actuated to displace carriage 18" along the rail 17" and take readings, as described above. For example, a first reading is taken at position 40, and measures the distance to the axle 38. A second reading is taken at position 42, on an opposite end of the object 36, measure the distance to the axle 38 at that end. The alignment of the axle thus can be determined with high precision. This may be repeated as desired at other intermediate portions of the object 36. The angular deviation of the object from the baseline 39 can also be measured as the difference in deviations measured on both sides of the object 36. This is the true axle profile (taped). If the deviations are not equal, the object can be adjusted until the axle 38 is in line.

In a modification of the embodiment of FIG. 3, the measurement device 10" can be used to align a plurality of objects, represented schematically in FIG. 3 by lines 44, 46, such as rollers in parallel. In this method, the baseline 16" is split with pentaprisms 48, 50, to produce second and third secondary laser baselines 52, 54, each of which is substantially perpendicular to the primary baseline 16". Subsystems consisting of positioners 14" and carriages 18" are positioned adjacent to the objects 44, 46, and operate in the same manner as for object 36 and its associated positioner 14".

The deviations from parallelism among objects 36, 44, 46, as well as deviation from perpendicular orientation relative to primary baseline 16" can thus be measured and displayed by computer 21". If the deviations are not equal, the objects 36, 44, 46 may be adjusted until the deviations are equal. Thus, alignment of a plurality of objects is determined with great accuracy.

The foregoing process is adaptable both to real time compensation as well as data collection. For example, most CNC machine tools have the ability to compensate for out of straightness conditions by referring to a look up table. If this look up table is created in an updatable format, the data from the baseline laser can be fed to this table on an averaging formula sufficient to maintain tolerance requirements.

Further, the present invention can also be applied in the field measurements to produce truly mobile precision instruments with very precise baseline capability.

Having described the invention in detail and by reference to preferred embodiments thereof, it will be apparent that modifications and variations are possible without departing from the scope of the invention defined in the appended claims.

What is claimed is:

1. A precision measurement system for measuring the surface profile of an object, said system comprising:
   a linearly displaceable carriage including non-contacting means for measuring a distance between said carriage means and said object and generating a signal indicative thereof;
   means for generating a laser beam as a baseline;
   means, associated with said carriage means, for detecting said baseline along a length of said object and measuring deviation of said carriage means from said baseline along said length and generating a deviation profile thereof; and
   means for receiving said distance signal and said deviation profile and calculating a value representative of a true surface profile of said object, whereby said surface profile of said object is determined from addition of said deviation profile to said surface distances in which deviation in travel of said carriage means from a straight line is compensated for.

2. The system of claim 1 wherein said baseline is substantially parallel to said object to be measured.

3. The system of claim 2 wherein said non-contacting means utilizes a triangulation sensor to determine said distance to said object.

4. The system of claim 3 further comprising means for transversing said carriage means adjacent to a surface of said object and sampling said baseline deviation and said surface distance at a plurality of points on said object to create said profiles.

5. The system of claim 4 wherein said surface profile is determined in realtime from said baseline deviation profile and said surface distance samples as said detector passes along said object.

6. The system of claim 5 wherein an instantaneous surface profile at any point on said object is equal to said baseline deviation and said surface distance at said point.

7. The system of claim 6 wherein said transversing means includes a linear positioner and wherein said detecting means and said measuring means are attached to said linear positioner for travel adjacent to said object surface.

8. The system of claim 7 wherein said measuring means is a laser sensor.

9. The system of claim 8 further comprising means for uploading said baseline deviation and said surface distance samples to a database.

10. The system of claim 9 further comprising means for adjusting a rate of sampling along said object surface in order to provide varying levels of precision in said system.

11. The system of claim 10 wherein said linear positioner and said generating means are affixed to a rigid frame.

12. The system of claim 11 further comprising a second laser baseline located on an opposite side of said object from said baseline, a second detecting means disposed along a path of said second baseline, and a second laser sensor mounted adjacent to said second detecting means, said second detecting means and said second laser measuring both a baseline deviation profile and a surface distance on said opposite side of said object at points common with said baseline and detecting means such that two surface profiles of said object are measured on two opposite sides of said object.

13. The system of claim 12 further comprising means for determining a caliper of said object from said baseline deviations and said surface distances sampled at common points along opposing sides of said object.

14. The system of claim 13 wherein said second baseline is substantially parallel to said first baseline.

15. The system of claim 10 further comprising means for attaching said linear positioner to said object.

16. The system of claim 15 wherein said attaching means includes fixtures located adjacent opposite ends of said positioner for supporting said positioner on said object surface and wherein said detector and said laser sensor are suspended between said fixtures for passage along said object surface.

17. A method for non-contact, precision measurement of a surface profile comprising the steps of:

generating a baseline laser beam;

detecting a deviation profile between said laser beam and a measuring device along the length of said surface;

measuring a distance profile between said measuring device and a surface along the length of said surface; and adding said baseline deviation profile and said surface distance profile to obtain a measurement of said surface profile.

18. The method of claim 17 further comprising the steps of:

detecting said baseline laser beam at a plurality of points along said surface;

measuring deviation between said measuring device and said baseline at each of said points;

measuring a surface distance at each of said points; and adding said deviations and said surface distances at each of said points to determine said surface profile.

19. The method of claim 18 wherein said baseline laser beam extends parallel to said surface.

20. A method for measuring object caliper comprising the steps of:

generating a pair of parallel laser beams on opposite sides of an object;

passing a pair of detectors along opposite sides of said object and detecting deviation profiles between said detectors and said laser beams along the length of said object;

then measuring a distance profile between each detector and said object along the length of said object; and adding said deviation profiles and said distance profile at common points on said object and subtracting from a known distance between said detectors to determine a realtime thickness of said object.

21. A method of aligning first and second objects in parallel comprising the steps of:

generating a first laser beam as a baseline;

splitting said baseline to produce a second laser beam, said second beam being substantially perpendicular to said baseline and substantially parallel to said first object;

generating a third laser beam in parallel with said second beam and being substantially parallel to said second object;

measuring deviation between said second beams and third beam and said first and second objects respectively; and adjusting relative positions of said first and second objects until said deviations between said objects and said second and third beam are equal.

22. The method of claim 21 further comprising the steps of measuring said deviation at a plurality of points along each of said objects; and adjusting a position of said objects so that said deviations at said points are equal.

23. A precision measurement system for aligning an object, said system comprising:

means for generating a laser beam as a baseline;

means for splitting said baseline to produce a second laser beam substantially perpendicular to said baseline;

means for measuring deviations between said second laser beam and an object at a plurality of points on said object; and means for adjusting a position of said object so that said deviations are equal, thereby aligning said object perpendicular to said baseline.

24. A precision measurement system for aligning first and second objects in parallel, said system comprising:

means for generating a laser as a baseline;

means for splitting said baseline to produce a second laser, said second laser being substantially perpendicular to said baseline and substantially parallel to said first object;

generating a third laser beam in parallel with said second beam and being substantially parallel to said second object;

means for measuring deviations between said second laser and said first object and said third laser and said second object at a plurality of points on said objects; and means for adjusting a relative position of said objects so that said deviations are equal, thereby aligning said objects in parallel.

25. A system for non-contact precision measurement of a surface profile comprising:

means for generating a laser beam as a baseline; and means for measuring deviations between said baseline and a measuring device wherein said deviation measurements compensate for mechanical inaccuracy in said system.

* * * * *